US011504867B2

(12) United States Patent
Sims et al.

(10) Patent No.: US 11,504,867 B2
(45) Date of Patent: Nov. 22, 2022

(54) RAZOR HANDLE

(71) Applicant: Beauty Perspectives, LLC, San Mateo, CA (US)

(72) Inventors: Daniel Jerome Sims, Lake Forest, CA (US); Yiqian Eric Liu, Jupiter, FL (US); Hailey Hwang, Glendale, CA (US)

(73) Assignee: Beauty Perspectives, LLC, San Mateo, CA (US)

( * ) Notice: Subject to any disclaimer, the term of this patent is extended or adjusted under 35 U.S.C. 154(b) by 0 days.

(21) Appl. No.: 17/229,468

(22) Filed: Apr. 13, 2021

(65) Prior Publication Data

US 2022/0088811 A1    Mar. 24, 2022

Related U.S. Application Data

(63) Continuation of application No. 17/228,356, filed on Apr. 12, 2021.
(Continued)

(51) Int. Cl.
*B26B 21/52* (2006.01)
*F16M 13/02* (2006.01)
*B26B 21/22* (2006.01)

(52) U.S. Cl.
CPC ............ *B26B 21/52* (2013.01); *B26B 21/521* (2013.01); *F16M 13/02* (2013.01); *B26B 21/22* (2013.01); *B26B 21/225* (2013.01)

(58) Field of Classification Search
CPC .............................. B26B 21/52; B26B 21/22
See application file for complete search history.

(56) References Cited

U.S. PATENT DOCUMENTS 2,414,653 A * 1/1947 Lookholder ............. A47K 1/09
  335/285
2,789,349 A * 4/1957 Lee .......................... B26B 3/02
  30/295

(Continued)

FOREIGN PATENT DOCUMENTS

GB          545789 A * 6/1942 ............. B26B 21/52

OTHER PUBLICATIONS

Googe.com define arm : https://www.google.com/search?q=define+arm&rlz=1C1GCEB_enUS803US803&oq=define+arm&aqs=chrome..69i57j0i433i512j69i6513j69i6112j69i60.1240j0j1&sourceid=chrome&ie=UTF-8 (Year: 2021).*
(Continued)

*Primary Examiner* — Sean M Michalski
(74) *Attorney, Agent, or Firm* — Kramer Levin Naftalis & Frankel LLP

(57) ABSTRACT

A razor handle with a counterbalance of a weight and/or magnet disposed therein are disclosed. The handle may include upper and lower enclosures extending between two opposing ends and may be divided into two parts: a base and an arm. The weight and/or magnet may be disposed within the base and between the upper and lower enclosures, and a horizontal length of the base may be less than the horizontal length of the arm. The counterbalance creates a center of mass of the base which is horizontally closer to a pivot surface than a center of mass of the arm. As a result, whenever a lower surface of the arm or a surface of an upper enclosure is placed in a resting position on a horizontal surface when the razor is not employed by a user, a cartridge coupled to the razor handle will not contact the horizontal surface.

8 Claims, 14 Drawing Sheets

Related U.S. Application Data

(60) Provisional application No. 63/081,114, filed on Sep. 21, 2020.

(56) References Cited

U.S. PATENT DOCUMENTS

| | | | | |
|---|---|---|---|---|
| 2,845,245 | A * | 7/1958 | Gray | A47K 1/09 248/314 |
| 2,853,780 | A * | 9/1958 | Bull | A47J 43/281 30/327 |
| 2,960,237 | A * | 11/1960 | McEnery | A45D 27/29 211/87.01 |
| 3,064,352 | A * | 11/1962 | Koe | A61C 3/00 30/298.4 |
| 3,204,338 | A | 9/1965 | Kruger et al. | |
| 3,367,482 | A | 2/1968 | Samsing | |
| 3,972,115 | A * | 8/1976 | Ross | B26B 21/32 30/59 |
| 4,077,119 | A * | 3/1978 | Sellera | B26B 21/446 30/41 |
| D253,144 | S * | 10/1979 | Heckler | D6/534 |
| D253,150 | S * | 10/1979 | Heckler | D6/527 |
| D259,226 | S * | 5/1981 | Lester | D6/526 |
| 4,275,862 | A * | 6/1981 | Takagi | A45D 27/29 248/205.3 |
| 4,389,777 | A * | 6/1983 | Landsberger | B25G 1/10 30/324 |
| D277,434 | S * | 2/1985 | Iten | D6/526 |
| 4,523,599 | A * | 6/1985 | Collet | A46B 17/08 132/313 |
| 4,644,645 | A * | 2/1987 | Audet | A45D 27/29 30/41 |
| D294,903 | S * | 3/1988 | Pokorny | D6/526 |
| 4,773,158 | A * | 9/1988 | Kertzman | A45D 27/29 30/32 |
| 4,945,598 | A * | 8/1990 | Racioppi | A45D 27/29 15/160 |
| 5,013,074 | A * | 5/1991 | Galle | A47G 23/0241 215/395 |
| 5,064,159 | A * | 11/1991 | Kotick | A47K 5/05 248/309.4 |
| 5,167,069 | A | 12/1992 | Quinn | |
| D333,583 | S * | 3/1993 | Hurd | D6/526 |
| 5,533,263 | A | 7/1996 | Gilder | |
| 5,590,472 | A * | 1/1997 | Yaakov | A47G 21/02 30/298.4 |
| 5,787,586 | A | 8/1998 | Apprille, Jr. et al. | |
| D407,274 | S * | 3/1999 | Lake | A46B 15/0002 D7/655 |
| 5,890,223 | A * | 4/1999 | Klemmer | A47G 21/02 30/326 |
| 5,950,280 | A * | 9/1999 | Taylor | A47J 45/10 16/DIG. 18 |
| 5,956,796 | A * | 9/1999 | Lodato | A46B 5/02 248/910 |
| 6,026,578 | A | 2/2000 | Brenner | |
| 6,029,354 | A | 2/2000 | Apprille, Jr. et al. | |
| 6,049,936 | A * | 4/2000 | Holley | A46B 5/02 15/176.1 |
| 6,223,442 | B1 * | 5/2001 | Pina | B26B 21/521 30/526 |
| 6,266,888 | B1 | 7/2001 | Zowaski | |
| 6,363,568 | B1 * | 4/2002 | Harrison | A46B 15/0097 15/176.1 |
| 6,490,760 | B1 * | 12/2002 | Lauer | A46B 5/00 16/110.1 |
| 6,749,788 | B1 | 6/2004 | Holden et al. | |
| 6,854,188 | B1 | 2/2005 | Wonderley | |
| 7,007,335 | B1 * | 3/2006 | Doat | A46B 15/0097 248/910 |
| 7,197,827 | B2 | 4/2007 | Paquette | |
| D592,403 | S * | 5/2009 | Nanda | A46B 15/0002 D4/107 |
| 7,654,003 | B2 * | 2/2010 | Simms | B26B 21/4056 30/34.05 |
| 7,856,910 | B2 * | 12/2010 | Kwok | B26B 3/00 83/13 |
| 8,205,846 | B2 * | 6/2012 | Glunk | E03C 1/06 248/309.4 |
| 8,387,197 | B2 * | 3/2013 | Moskovich | A46B 15/0002 15/22.1 |
| 8,484,852 | B2 | 7/2013 | King | |
| 8,584,837 | B1 * | 11/2013 | Mather | A45D 27/24 206/208 |
| 8,732,955 | B2 | 5/2014 | Howell et al. | |
| 8,769,832 | B1 * | 7/2014 | Joyner | A47J 43/28 30/340 |
| 8,936,222 | B1 * | 1/2015 | Bastian | H04B 1/3877 248/206.5 |
| 9,445,691 | B1 * | 9/2016 | Joyner | A47J 43/28 |
| 9,694,504 | B2 * | 7/2017 | Gratsias | B26B 21/522 |
| 9,730,500 | B1 * | 8/2017 | Provost | A45D 27/29 |
| 9,751,226 | B2 | 9/2017 | Psimadas et al. | |
| 10,092,087 | B2 * | 10/2018 | Zimmerman | A46B 9/04 |
| 10,104,950 | B1 * | 10/2018 | Provost | A45D 27/29 |
| D845,543 | S | 4/2019 | Efthimiadis et al. | |
| 10,538,008 | B2 * | 1/2020 | Gratsias | B26B 21/225 |
| 10,875,199 | B2 * | 12/2020 | Han | B26B 21/4018 |
| 10,960,562 | B2 * | 3/2021 | Han | B26B 21/20 |
| 2001/0006069 | A1 * | 7/2001 | Treskov | B26B 21/40 132/290 |
| 2002/0153863 | A1 * | 10/2002 | Arndt | H01R 13/2464 320/115 |
| 2003/0070309 | A1 * | 4/2003 | Brown | B26B 21/528 30/535 |
| 2003/0177648 | A1 | 9/2003 | Zeiter | |
| 2003/0208913 | A1 * | 11/2003 | Paquette | B26B 21/52 30/526 |
| 2004/0093735 | A1 * | 5/2004 | Ohtsubo | B26B 21/522 30/526 |
| 2004/0188576 | A1 * | 9/2004 | Carnevali | F16M 13/00 248/206.5 |
| 2006/0032054 | A1 * | 2/2006 | Simms | B26B 21/38 30/34.05 |
| 2007/0084063 | A1 * | 4/2007 | Hughes | A47J 43/1093 30/298.4 |
| 2007/0214650 | A1 * | 9/2007 | Tomazini | B26B 3/02 30/142 |
| 2009/0056141 | A1 * | 3/2009 | Barry | B26B 21/40 30/41.7 |
| 2010/0281698 | A1 | 11/2010 | King | |
| 2013/0312272 | A1 * | 11/2013 | Wilson | B26B 21/14 30/532 |
| 2014/0150264 | A1 * | 6/2014 | Micinilio | B26B 21/522 30/41 |
| 2015/0230640 | A1 * | 8/2015 | Brady | A47G 21/023 30/322 |
| 2015/0314464 | A1 * | 11/2015 | Guzak | B26B 21/52 30/41 |
| 2015/0320178 | A1 * | 11/2015 | Fish | A45D 40/00 222/1 |
| 2017/0129116 | A1 * | 5/2017 | Gratsias | B26B 21/52 |
| 2017/0202383 | A1 * | 7/2017 | Yew | A47G 21/023 |
| 2018/0206611 | A1 * | 7/2018 | Schaefer | H01F 7/0252 |
| 2018/0207820 | A1 * | 7/2018 | Schaefer | B26B 19/3873 |
| 2019/0084169 | A1 | 3/2019 | Bonk et al. | |
| 2019/0098982 | A1 * | 4/2019 | Atlason | B26B 19/3833 |
| 2020/0180178 | A1 | 6/2020 | Park et al. | |
| 2020/0346358 | A1 | 11/2020 | Park et al. | |
| 2021/0008743 | A1 | 1/2021 | Lee et al. | |
| 2021/0170616 | A1 * | 6/2021 | Avery | B26B 21/521 |
| 2021/0299898 | A1 * | 9/2021 | McDaniel | B26B 21/225 |

OTHER PUBLICATIONS

Hyperphysics: http://hyperphysics.phy-astr.gsu.edu/hbase/mass. html date from Wayback machine: http://web.archive.org/web/20150504055635/http://hyperphysics.phy-astr.gsu.edu/hbase/mass. html (Year: 2015).*

(56) References Cited

OTHER PUBLICATIONS

International Application No. PCT/US2021/050989, International Search Report, International Filing Date Sep. 17, 2021, dated Feb. 15, 2022.

* cited by examiner

RAZOR HANDLE

CROSS-REFERENCE TO RELATED APPLICATION

This application is a continuation of U.S. patent application Ser. No. 17/228,356, filed Apr. 12, 2021, which claims the benefit of U.S. Provisional Patent Application No. 63/081,114, filed Sep. 21, 2020, both of which are incorporated by reference herein in its entirety. In addition, this application incorporates by reference U.S. patent application Ser. No. 29/776,300 herein in its entirety.

BACKGROUND

Handheld razors include a cartridge of blades coupled to a razor handle. In many instances, one or more strips employ lubricant(s) may to help achieve a closer shave and/or provide a moisturizer to the shaver's or user's skin. When the user is finished with his or her shave, the razor is often placed on a surface in a position where the lubricating strips contact the surface which can result with a messy surface and/or an unhygienic exposure to surface germs.

SUMMARY

Embodiments of the inventive concepts disclosed herein are directed to a razor comprising a razor handle and a cartridge. The use of this razor may improve the cleanliness of the shaving area and/or hygiene of a user by preventing the cartridge from contacting a surface upon which the razor rests when not employed by the user.

In one aspect, embodiments of the inventive concepts disclosed herein are directed to a razor handle comprising a weight and/or a magnet therein and disposed between upper and lower surfaces which extend between two opposing ends. In some embodiments, razor handle may be defined with a base and an arm. With the weight disposed within the base and the razor handle being placed in a resting position, the weight within a base sections acts as a counterbalance to a moment created by the arm to prevent the arm and cartridge of blades coupled to the arm from contacting the surface when the razor is not employed by a user.

In another aspect, embodiments of the inventive concepts disclosed herein are directed to a razor handle defined with a base and an arm, wherein a weight and/or a magnet are disposed within the base. The base has a center of mass located a first distance from a pivot surface, and the arm has a center of mass located a second distance from the pivot surface. In some embodiments, the first distance is less than the second distance to prevent the arm and cartridge of blades coupled to the arm from contacting the surface when the razor is not employed by a user.

In a further aspect, a first moment of the base about a horizontal axis is greater than a second moment of the arm about the horizontal axis when a lower surface of the base rests on a horizontal surface when the razor handle is not employed by a user.

In a further aspect, a horizontal length of the base is less than a horizontal length of the arm.

BRIEF DESCRIPTION OF THE DRAWINGS

For a fuller understanding of the inventive embodiments, reference is made to the following description taken in connection with the accompanying drawings in which.

DETAILED DESCRIPTION

Figure 1A:
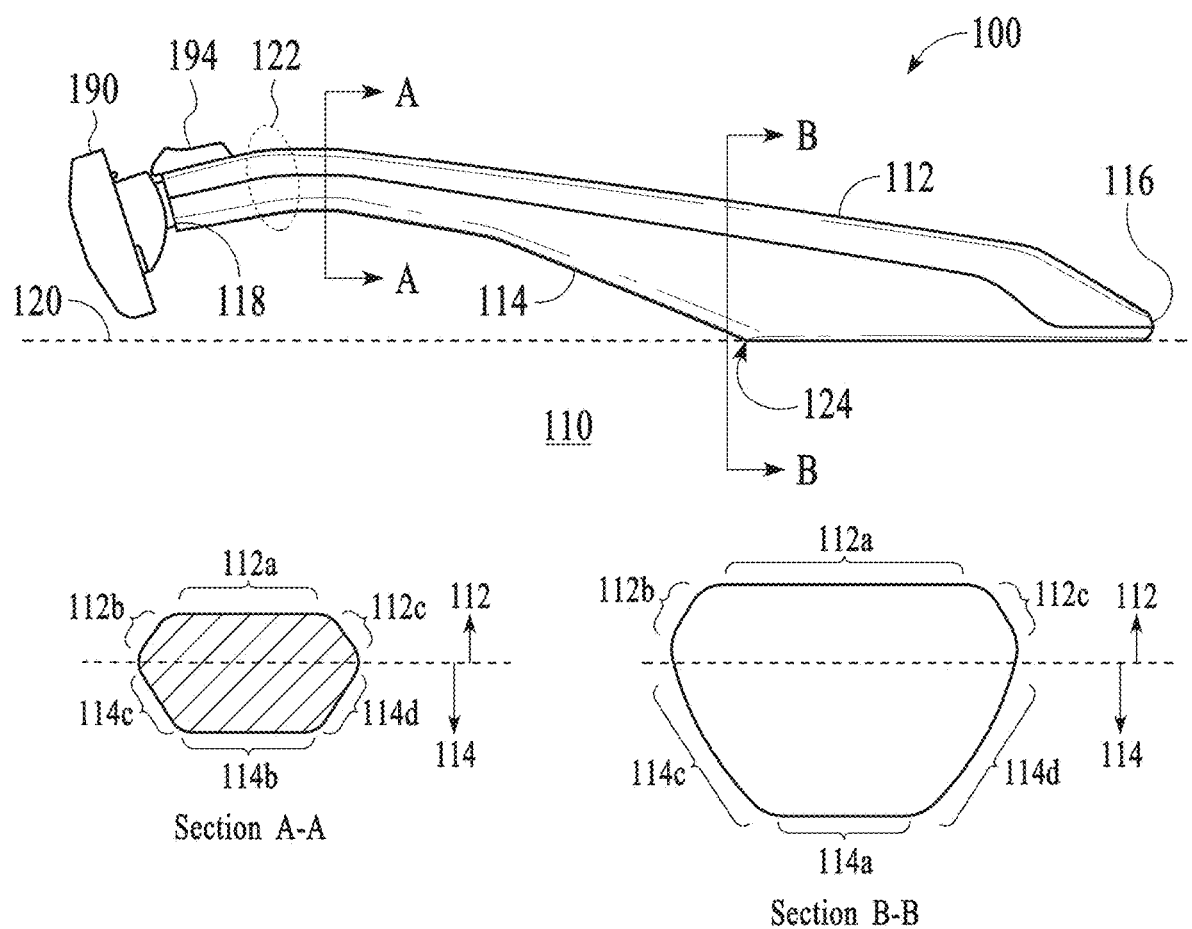
FIGS. 1A through 1D illustrate side, top, bottom, and perspective views, respectively, of a razor, in accordance with some embodiments.
Figure 1B:
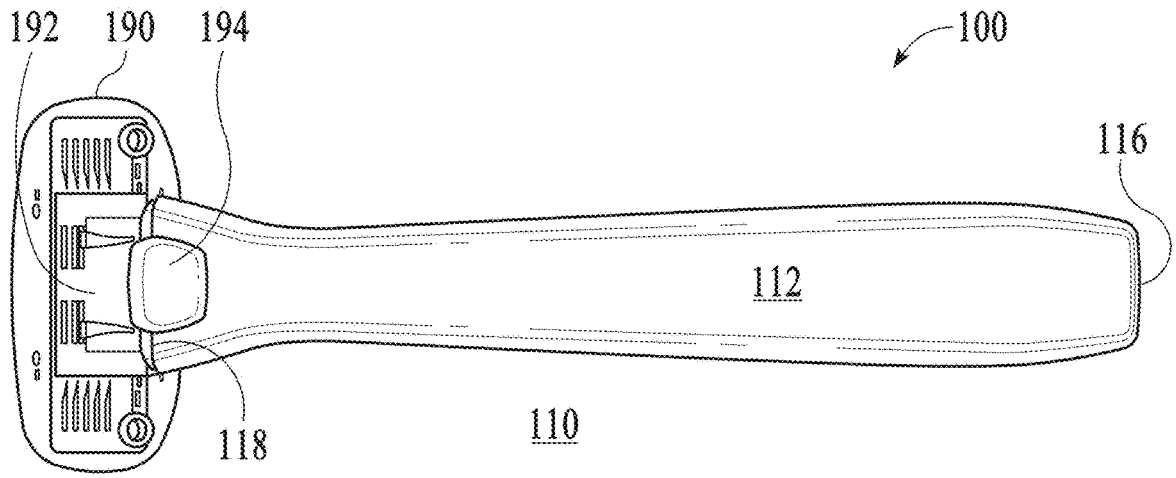
Figure 1C:
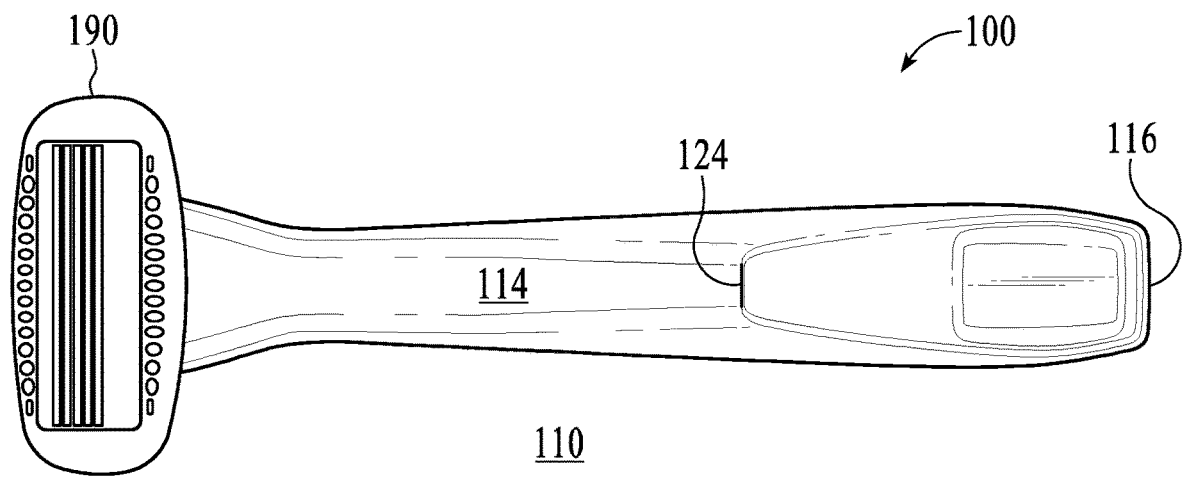
Figure 1D:
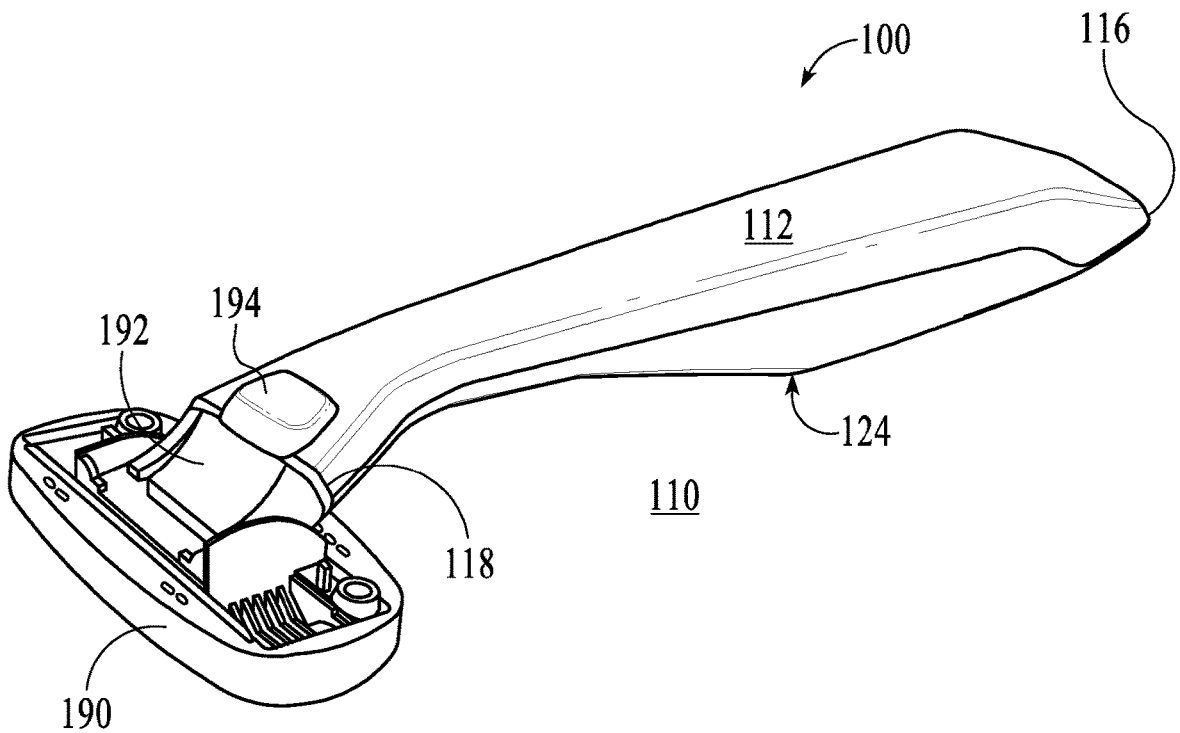
Figure 2A:
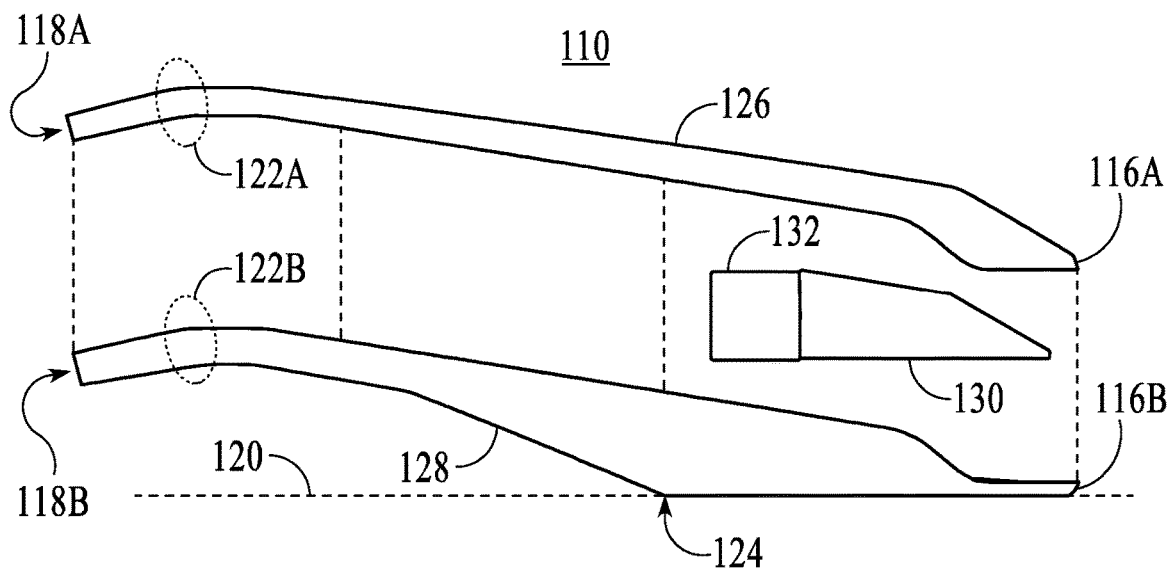
FIGS. 2A through 2D illustrate side, top, bottom, and side views of a razor handle, in accordance with some embodiments.
Figure 2B:
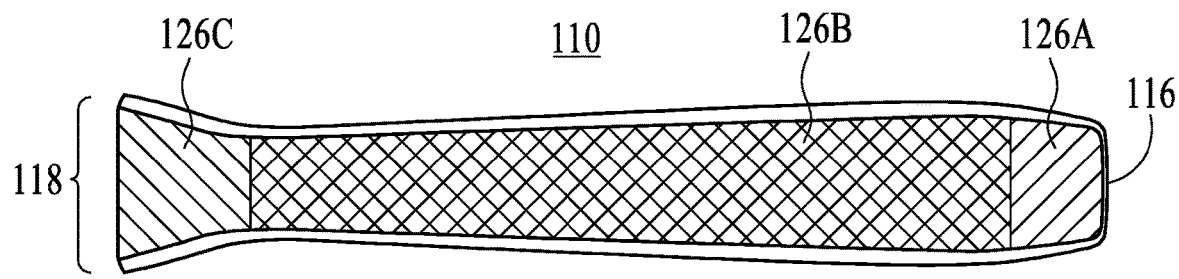
Figure 2C:
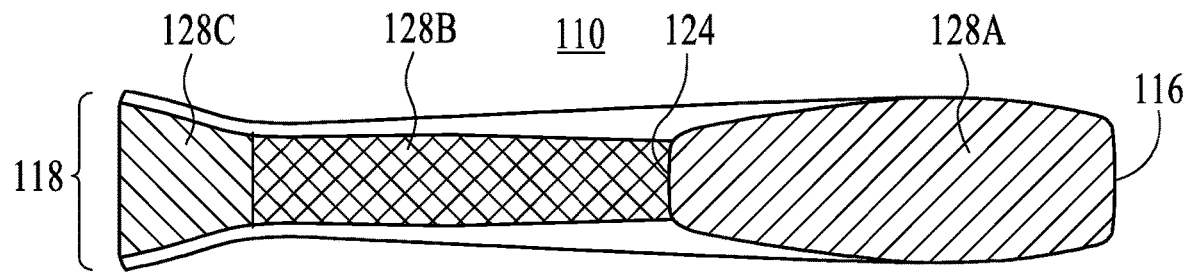
Figure 2D:
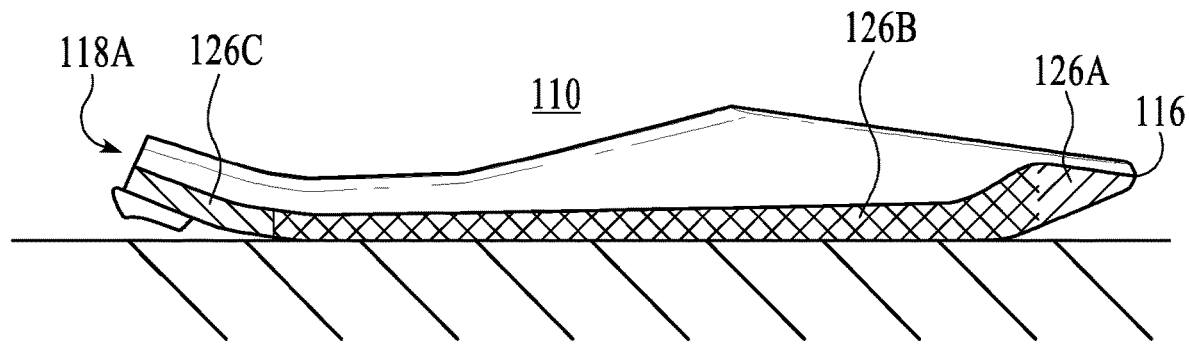

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

FIGS. 1A through 1D, side, top, bottom, and perspective views are shown, respectively, to illustrate an embodiment of razor 100 suitable for implementation of the inventive concepts described herein. Razor 100 includes razor handle 110, cartridge 190 within which one or more blades are disposed, and cartridge receiving module 192 for coupling cartridge 190 to razor handle 110.

The external surface of razor handle 110 includes upper external surface 112 and lower external surface 114 extending between first end 116 and second end 118 to which cartridge 190 is coupled. Upper external surface 112 extends upwardly away from horizontal reference 120 between first end 116 and neck 122 and downwardly towards horizontal reference 120 between neck 122 and second end 118. Upper external surface 112 includes a flat top surface 112a extending between first and second ends 116 and 118, and opposing sidewall surfaces 112b and 112c extending downward from flat top surface 112a until reaching lower external surface 114. Lower external surface 114 includes a first flat bottom surface 114a extending between first end 118 and pivot surface 124, a second flat bottom surface 114b extending between second end 118 and pivot surface 124, and opposing sidewall surfaces 114c and 114d extending upward from the first and second flat bottom surfaces until reaching upper external surface 112.

Lower external surface 114 extends substantially parallel to and/or along horizontal reference 120 between first end 116 and pivot surface 124, upwardly away from horizontal reference 120 between pivot surface 124 and neck 122, and downwardly towards horizontal reference 120 between neck 122 and second end 118.

In some embodiments, second end 118 may include opening into which cartridge receiving module 192 may be permanently inserted to facilitate the coupling of cartridge 190 to razor handle 110. In addition, cartridge receiving module 192 may include button 194 that, when pushed towards cartridge 190, ejects or decouples cartridge 190 from razor handle 110.

Referring now to FIGS. 2A through 2D, side, top, bottom, and side views of razor handle 110 are illustrated, respectively. Razor handle 110 may be formed from upper enclosure 126 and lower enclosure 128, and weight 130 and/or magnet 132 disposed substantially vertically between upper and lower enclosures 126 and 128, respectively, where the internal structures of upper and lower enclosures 126 and 128, respectively, have been adapted to secure a counterbalance comprising a weight 130 and/or magnet 132 in between these enclosures. Similarly, weight 130 and/or magnet 132 are disposed substantially horizontally between first end 116 and pivot surface 124. As embodied herein, the counterbalance counters the weight (or mass) of razor handle 110 between it and second end 118 so that neither second end 118 nor cartridge 190 coupled to second of razor handle 110 contacts neither surface 162 (shown below) when razor handle 110 rests in a horizontal resting position when not employed by a user nor vertical surface 208 (shown below) when razor handle 110 magnetically rests in a vertical resting position when not employed by a user.

Using an alternative frame of reference, weight 130 and/or magnet 132 are disposed substantially vertically between upper and lower external surfaces 112 and 114, respectively, wherein the internal structure in between upper and lower external surfaces 112 and 114 has been adapted to secure weight 130 and/or magnet 132 in between these surfaces.

In some embodiments, weight 130 and magnet 132 may be separate components. In some embodiments, weight 130 and magnet 132 may be integrated into and/or manufactured as one component. As discussed in detail below, weight 130 and/or magnet 132 may be employed to hold down base 134 and/or as a counterbalance to arm 136 so that a moment of base 134 (which includes weight 130 and/or magnet 132) exceeds an opposing moment of arm 136. If cartridge 190 is coupled to razor handle 110, weight 130 and/or magnet 132 may be employed to hold down base 134 and/or as a counterbalance to arm 136 and cartridge 190 so the moment base 134 exceeds opposing moments of arm 136 and cartridge 190.

Upper and lower enclosures 126 and 128, respectively, extend between first end 116 and second end 118. The external surface of upper enclosure 126 may include contiguous sections including, but not limited to, first upper section 126a, second upper section 126b, and third upper section 126c; likewise, the external surface of lower enclosure 128 may include continuous sections including, but not limited to, first lower section 128a, second lower section 128b, and third lower section 128c.

First upper section 126a extends upwardly away from first end 116 at angle measured from horizontal reference 120. Second upper section 126b extends upwardly away from first upper section 126a at a lesser angle measured from horizontal reference 120 until reaching neck 122. Third upper section 126c extends downwardly away from second upper section 126b and towards horizontal reference 120 until reaching second end 118.

First lower section 128a extends away from first end 116 and substantially parallel to horizontal reference 120 until reaching pivot surface 124. Second lower section 128b extends upwardly from pivot surface 124 and generally towards second upper section 126b. Third lower section 128c extends downwardly away from second lower section 128b and towards horizontal reference 120.

Figure 3A:
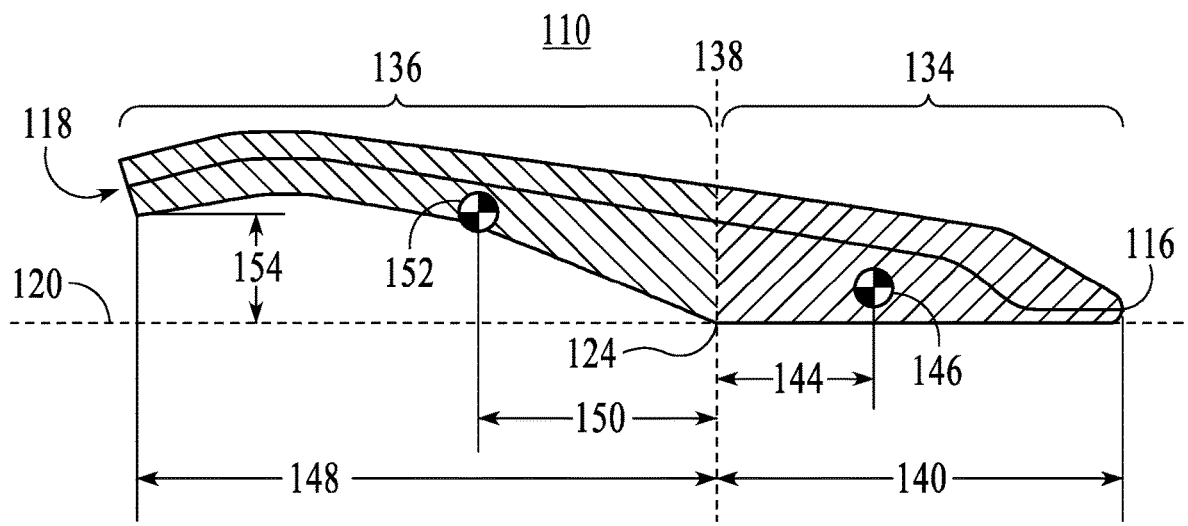
FIGS. 3A through 3C illustrate side, top, and bottom views of the razor handle, in accordance with some embodiments.
Figure 3B:
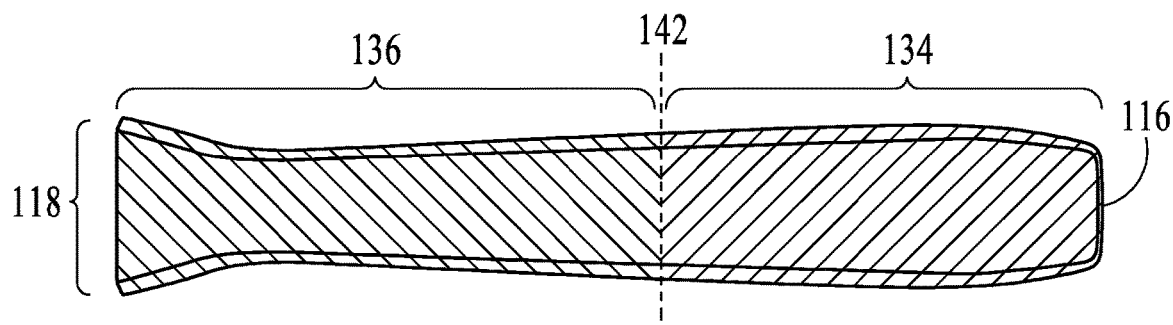
Figure 3C:
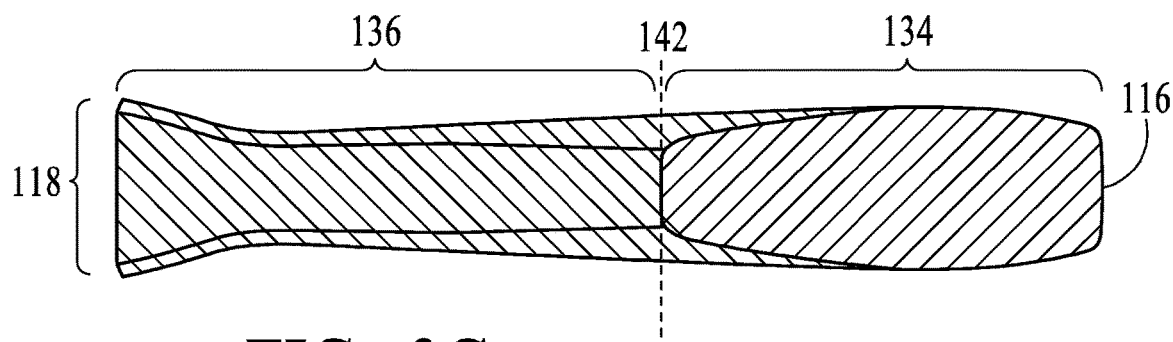

Referring now to FIGS. 3A through 3C, side, top, and bottom views of 110 razor handle are illustrated, respectively. As shown, razor handle 110 may be defined by or divided into base 134 and arm 136. Base 134 includes weight 130 and/or magnet 132 (neither shown) and may be the portion of razor handle 110 in between first end 116 and vertical reference 138 extending through pivot surface 124 and substantially perpendicularly from horizontal reference 120. Arm 136 may be the portion of razor handle 110 in between vertical reference 138 and second end 118 (i.e., portion of razor handle 110 that excludes base 134).

Length 140 of base 134 may be the horizontal distance between pivot axis 142 (about which pivot surface 124 pivots) and first end 116, and moment arm 144 of base 134 may be the horizontal distance between pivot axis 142 and center of mass 146 of base 134. Likewise, length 148 of arm 136 may be the horizontal distance between pivot axis 142 and second end 118, and moment arm 150 of arm 136 may be the horizontal distance between pivot axis 142 and center of mass 152 of arm 136. As shown, length 140 is less than length 148 and moment arm 144 is less than moment arm 150.

Height 154 of second end 118 above horizontal reference 120 may be the vertical distance between horizontal reference 120 and the bottom of second end 118 as measured along a vertical axis (not shown) extending perpendicularly away from horizontal reference 120 and through the bottom of the second end 118.

Figure 3D:
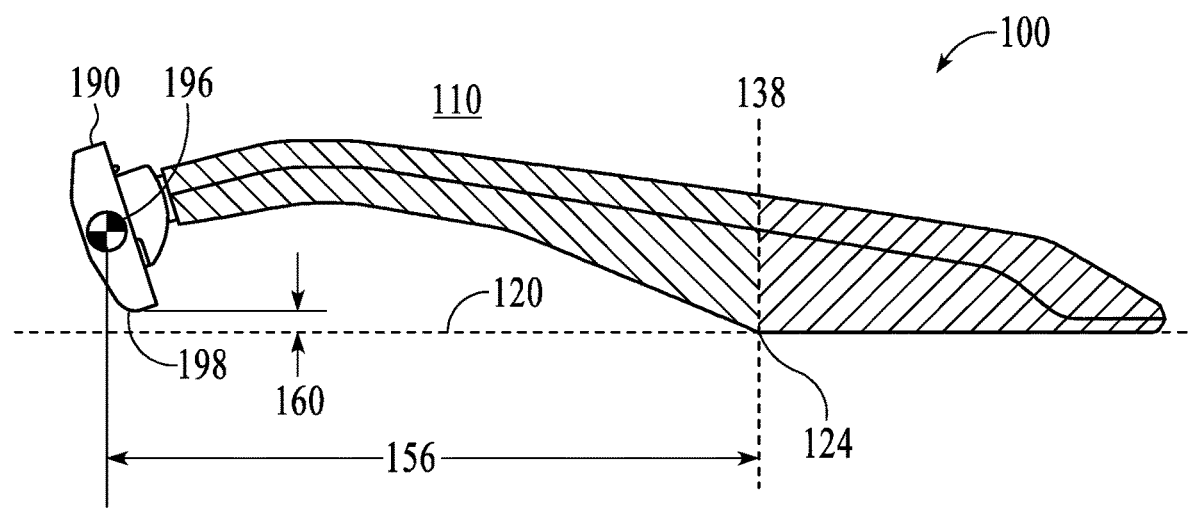
FIG. 3D illustrates a side view of the razor, in accordance with some embodiments.

Referring to FIG. 3D, a side view of razor 100 is illustrated. Cartridge 190 is coupled to razor handle 110. Moment arm 156 may be the horizontal distance between pivot axis 142 (about which pivot surface 124 pivots) and center of mass 196 of cartridge 190. As shown, moment arm 150 as shown in FIG. 3A is less than moment arm 156. Height 160 of cartridge 190 above horizontal reference 120 may be the vertical distance between horizontal reference 120 and point 198 of cartridge 190, the closest point of cartridge 190 to horizontal reference 120 as measured along a vertical axis (not shown) extending perpendicularly away from horizontal reference 120 and through point 198 and parallel to vertical reference 138.

Figure 4A:
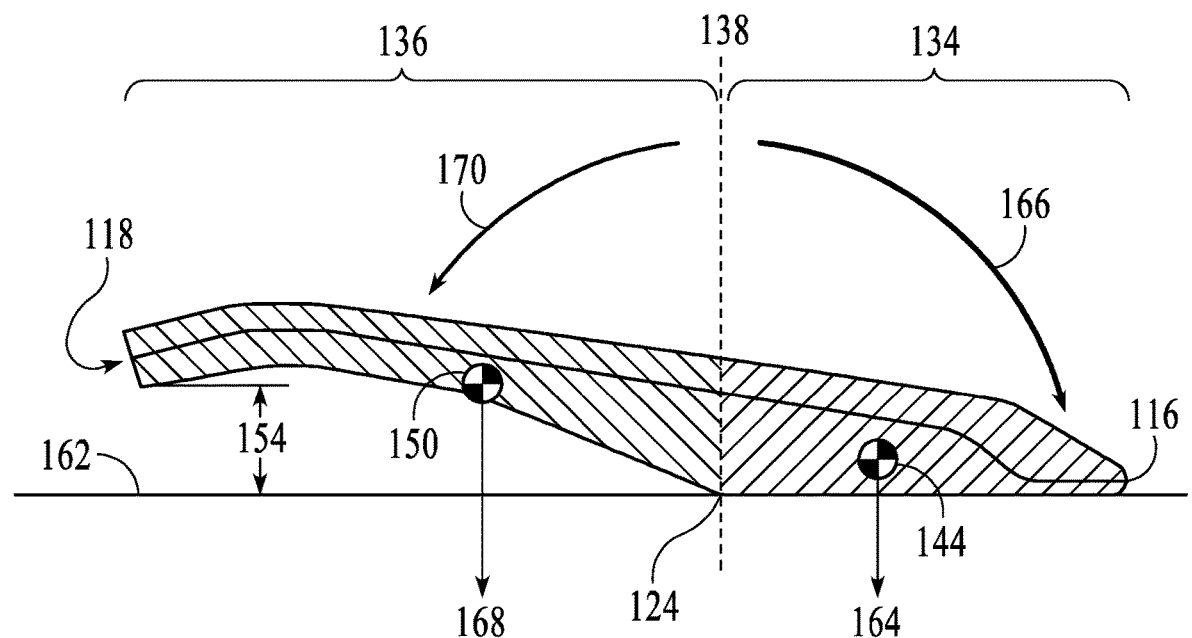
FIGS. 4A through 4C illustrate side views of the razor handle, in accordance with some embodiments.
Figure 4B:
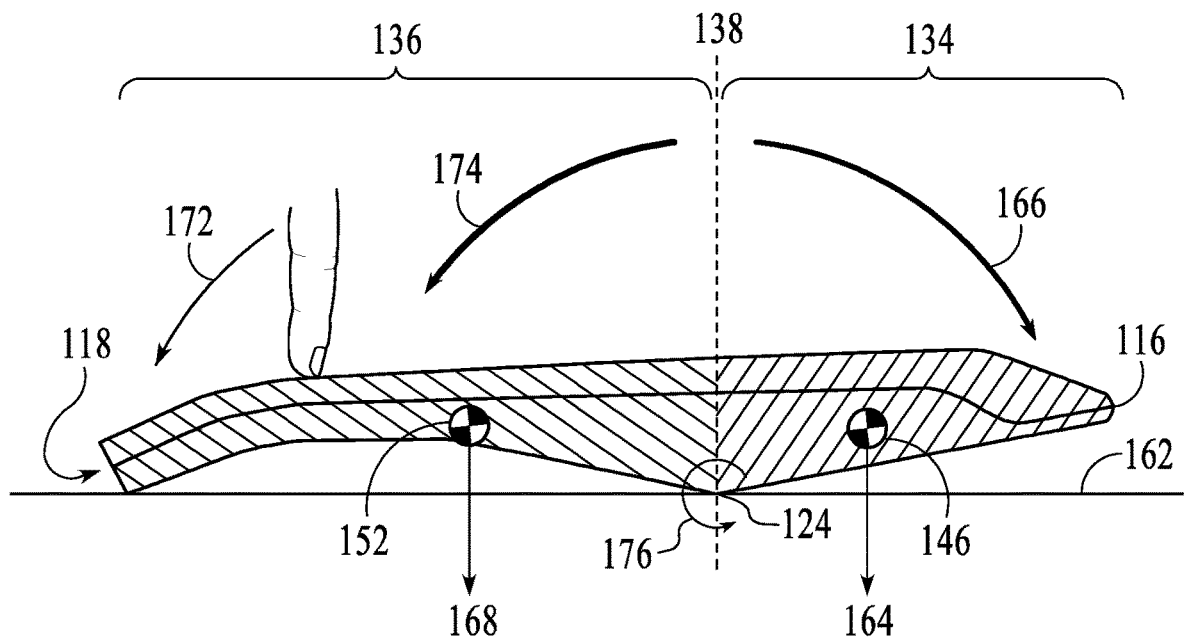
Figure 4C:
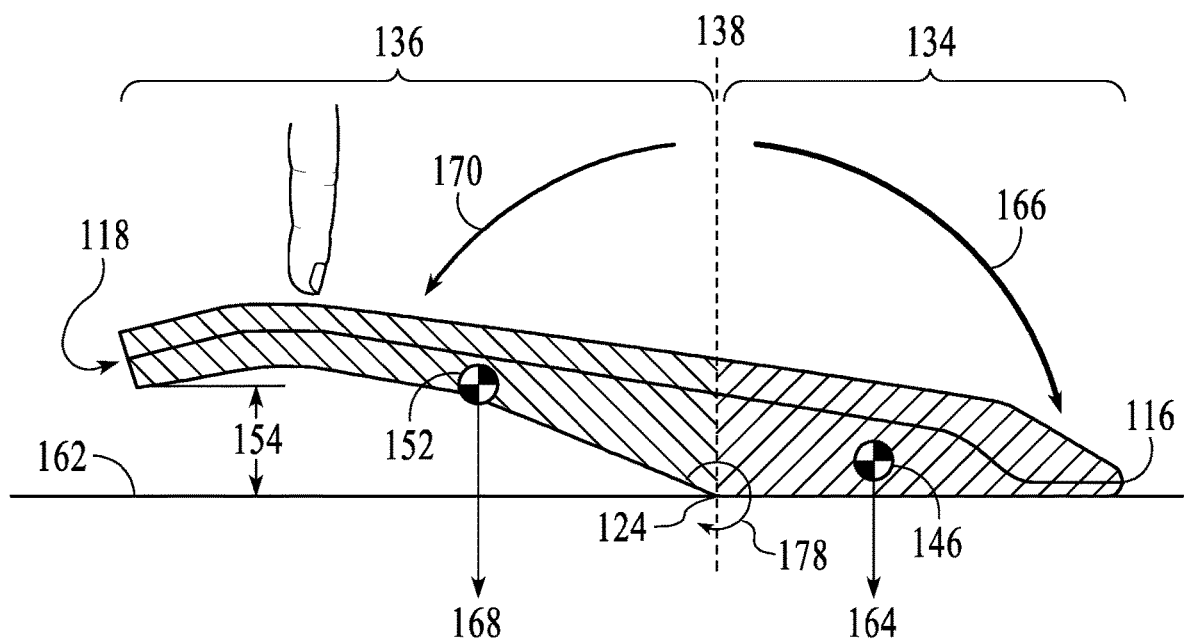

Referring now to FIGS. 4A through 4C, side views of razor handle 110 are illustrated. In FIG. 4A, razor handle 110 has been placed in a horizontal resting position on surface 162 such as, but not limited to, a horizontal bathroom counter next to sink when not in use. The distributed mass or weight of base 134, as represented by concentrated force 164 being applied to center of mass 146, creates a clockwise moment 166 about pivot surface 124; similarly, the distributed mass or weight of arm 136, as represented by concentrated force 168 being applied to center of mass 152, creates a counterclockwise moment 170 about pivot surface 124. As embodied herein, clockwise moment 166 exceeds counterclockwise moment 170 when razor handle 110 rests in its horizontal resting position on surface 162.

In FIG. 4B, a finger has applied a downward force on arm 136 to create counterclockwise moment 172 that, when added to counterclockwise moment 170, creates a total counterclockwise moment 174 that exceeds clockwise moment 166. This causes razor handle 110 to pivot counterclockwise 176 about pivot surface 124 until second end 118 contacts surface 162 and first end 116 rises above surface 162 as shown.

In FIG. 4C, the finger has released the downward force on arm 136 to release counterclockwise moment 172. This causes razor handle 110 to pivot clockwise 178 about pivot surface 124 in a clockwise direction until lower external surface 114 (or first lower section 128a) of razor handle 110 returns to its horizontal resting position on surface 162 and second end 118 returns to its horizontal resting position at height 154 above surface 162.

Figure 4D:
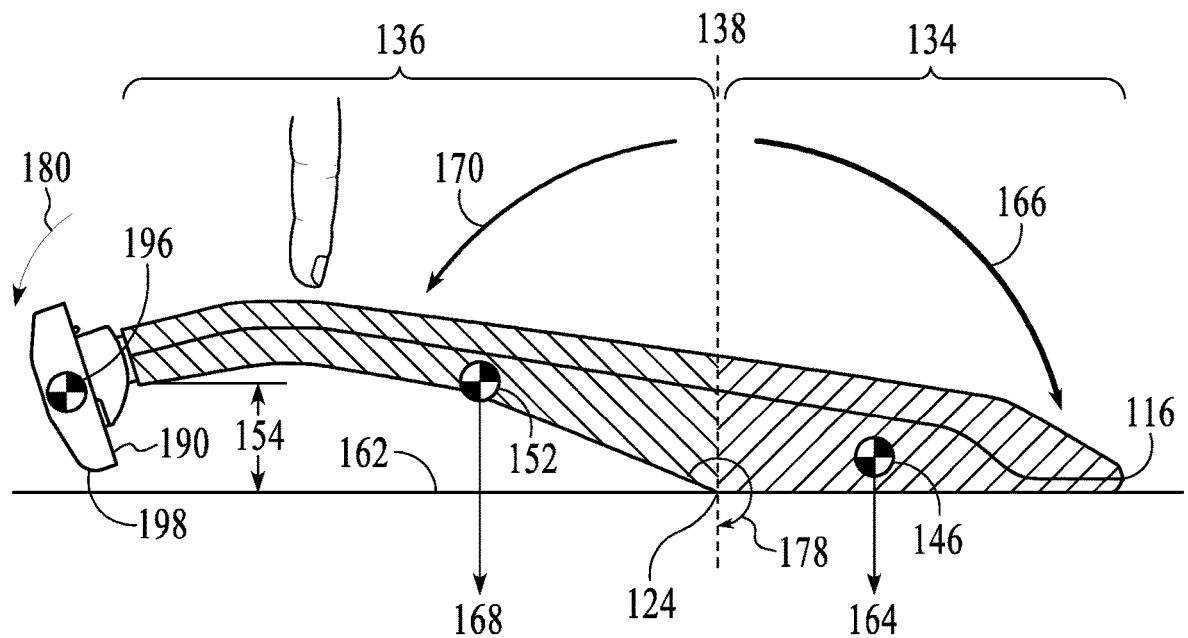
FIGS. 4D and 4E illustrate side views of the razor, in accordance with some embodiments.
Figure 4E:
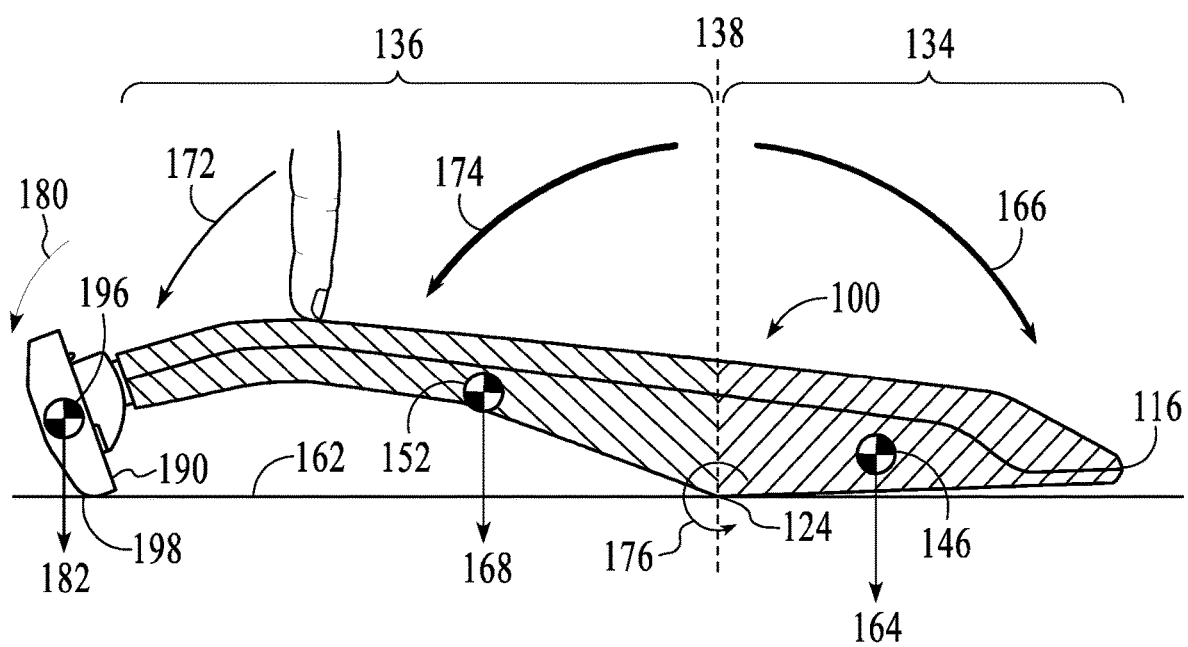

Referring now to FIGS. 4D and 4E, side views of razor 100 are illustrated. In FIG. 4D, razor handle 110 with cartridge 190 coupled has been placed in the horizontal resting position. In addition to the presence of clockwise moment 166 and counterclockwise moment 170, the distributed weight of cartridge 190 creates a counterclockwise moment 180 about pivot surface 124, where the distributed weight of cartridge 190 is represented by concentrated force 172 being applied to center of mass 196. Even with the addition of counterclockwise moment 180, the sum of counterclockwise moments 170 and 180 do not exceed clockwise moment 166 when razor handle 110 rests in its horizontal resting position on surface 162.

In FIG. 4E, a finger has applied a downward force on arm 136 to create counterclockwise moment 184 that, when added to counterclockwise moments 170 and 180, creates a total counterclockwise moment 174 that exceeds clockwise moment 166. This causes razor handle 110 to pivot counterclockwise 176 about pivot surface 124 until point 198 of cartridge 190 contacts surface 162 and first end 116 rises above surface 162 as shown.

Figure 5A:
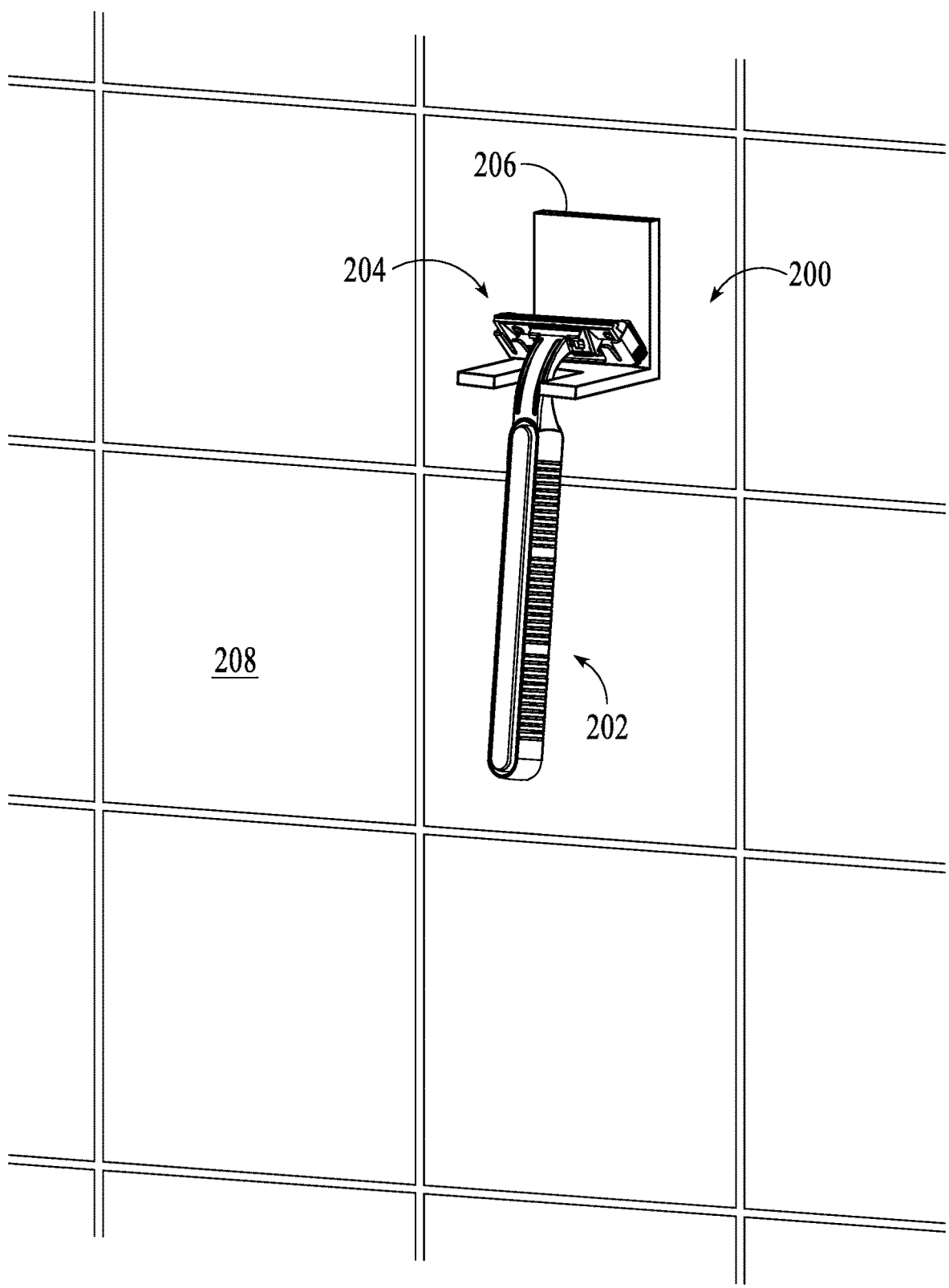
FIGS. 5A and 5B illustrate exemplars of prior art razor holder systems, in accordance with some embodiments.
Figure 5B:
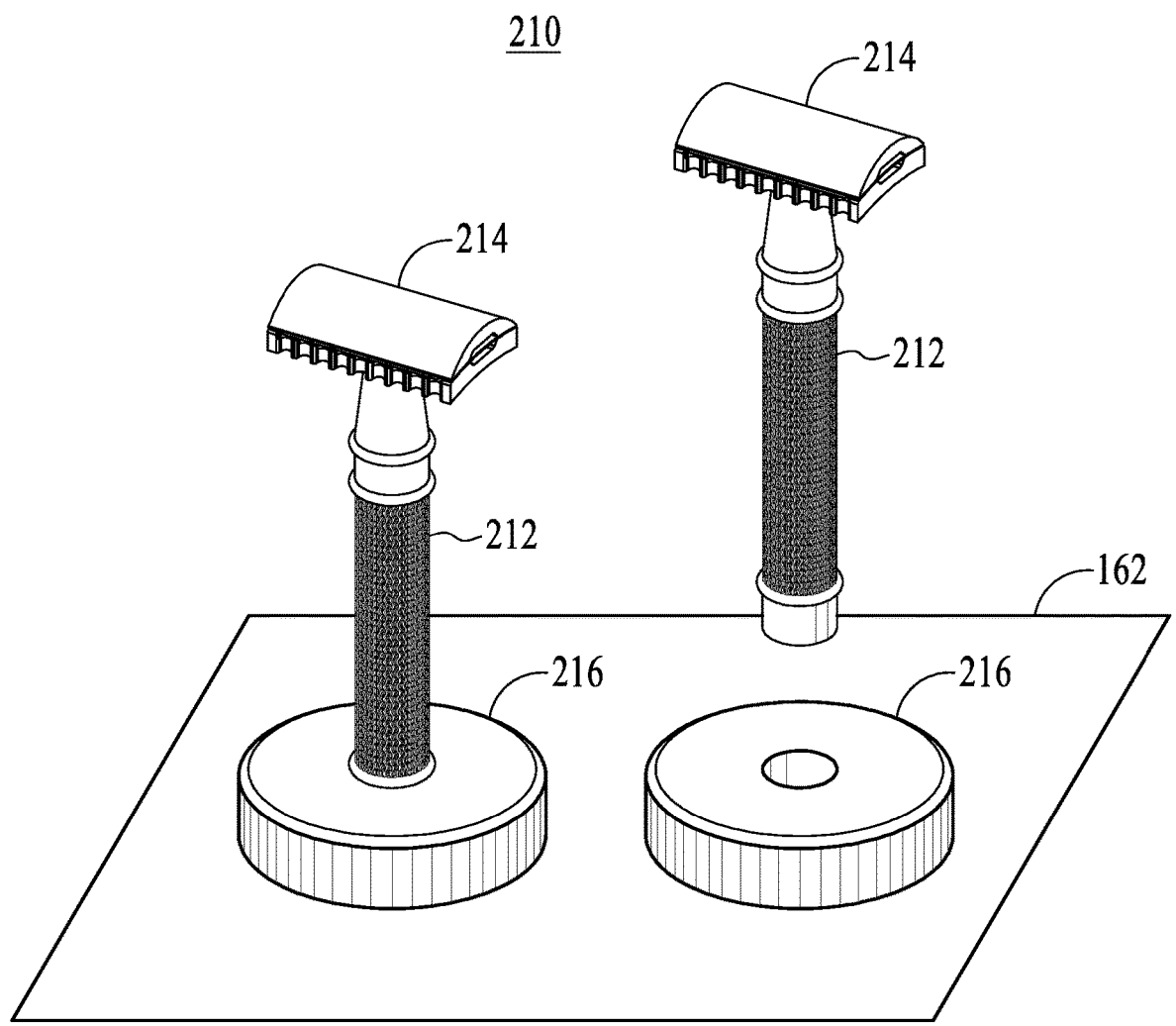

Referring now to FIGS. 5A and 5B, two exemplars of prior art razor holder systems are illustrated. In FIG. 5A, razor holder system 200 includes razor handle 202 and cartridge 204 being held in place by razor holder 206 securely mounted to vertical surface 208 when razor 200 is not employed by a user. In FIG. 5B, razor holder system 210 includes razor handle 212 and cartridge 214 being held in place by razor holder 216 resting on horizontal surface 162 when razor 210 is not employed by a user.

Figure 5C:
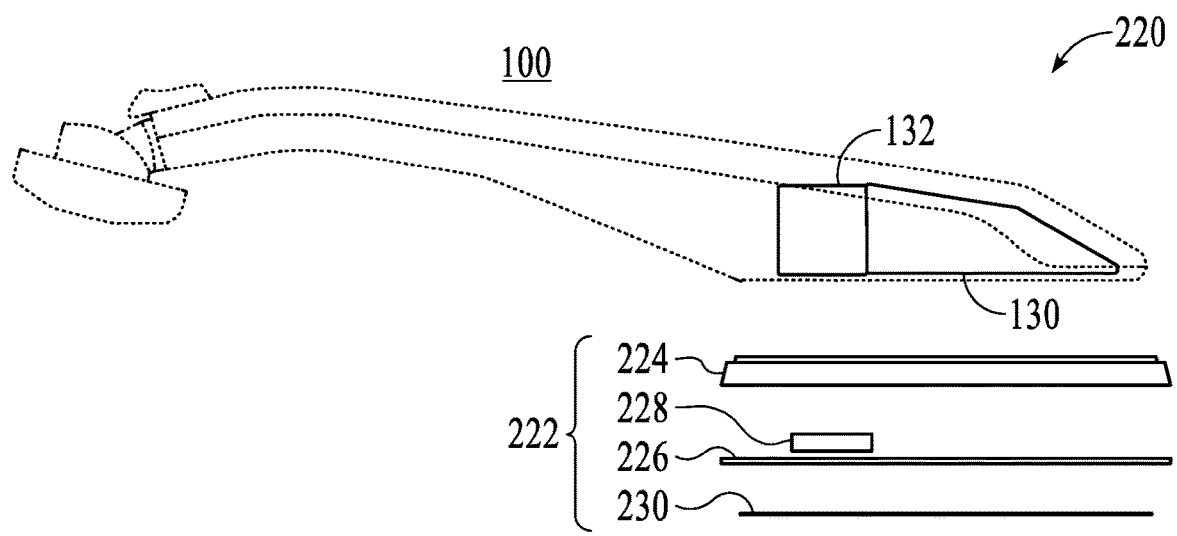
FIGS. 5C through 5E illustrate side, lower perspective, and upper perspective views of a razor holder system, in accordance with some embodiments.
Figure 5D:
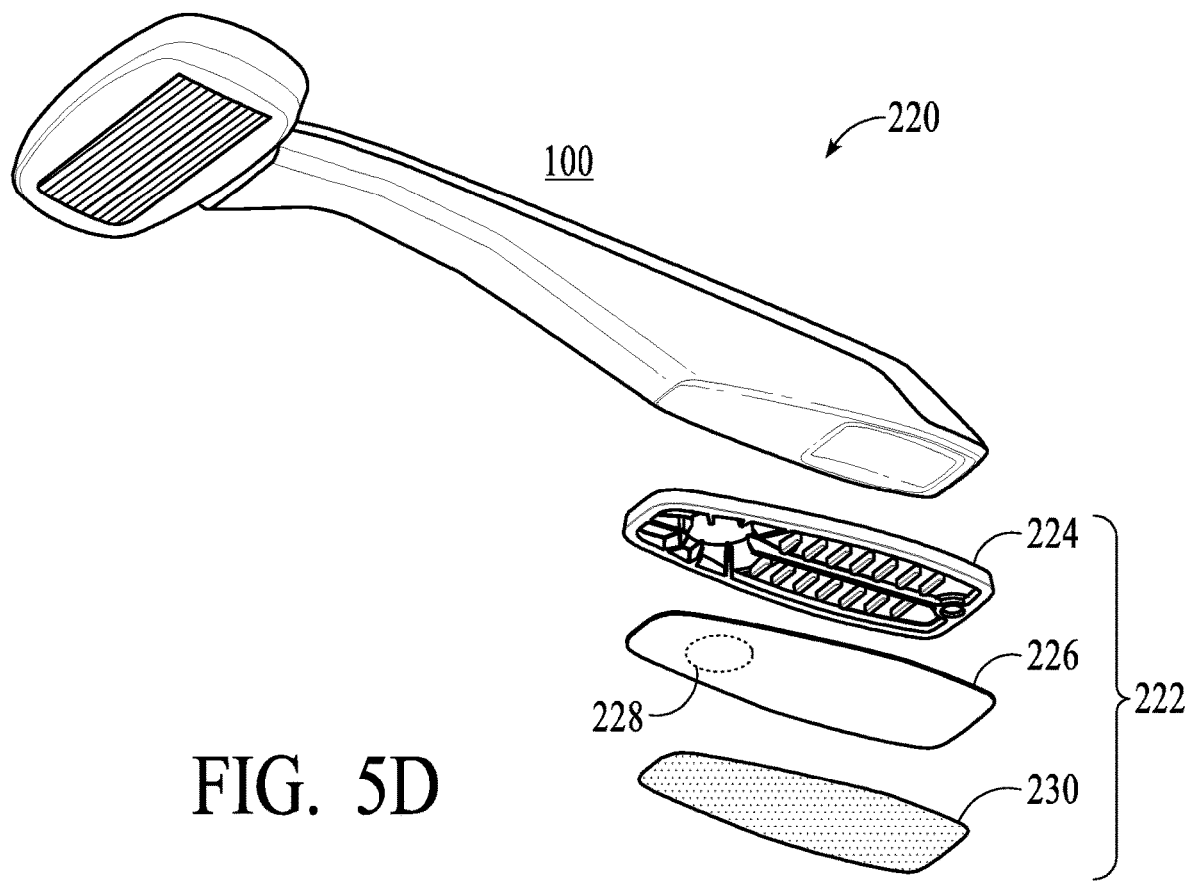
Figure 5E:
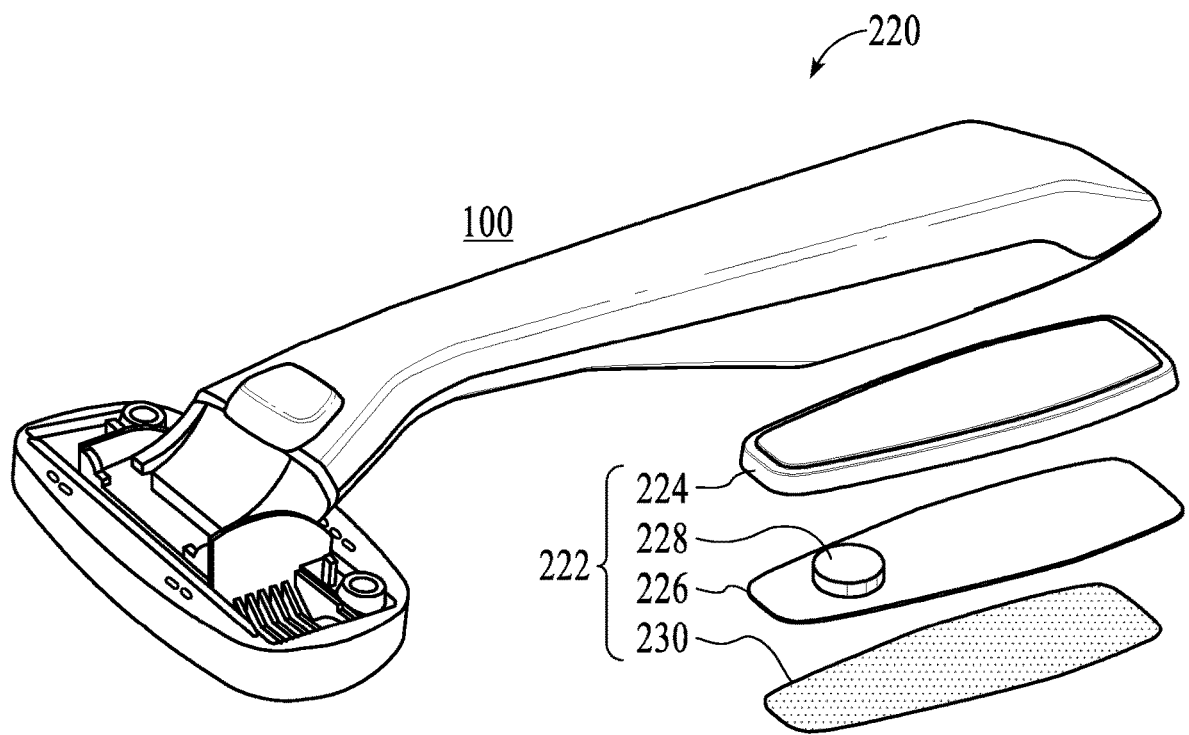

Referring now to FIGS. 5C through 5E, side, lower perspective, and upper perspective views of razor holder system 220 are illustrated. Razor holder 222 include upper and lower enclosures 224 and 226, respectively, and magnet 228 disposed in between them. In some embodiments, upper enclosure 224 may include an aperture through which magnet 228 may be extend upwardly from lower enclosure 226.

Figure 5F:
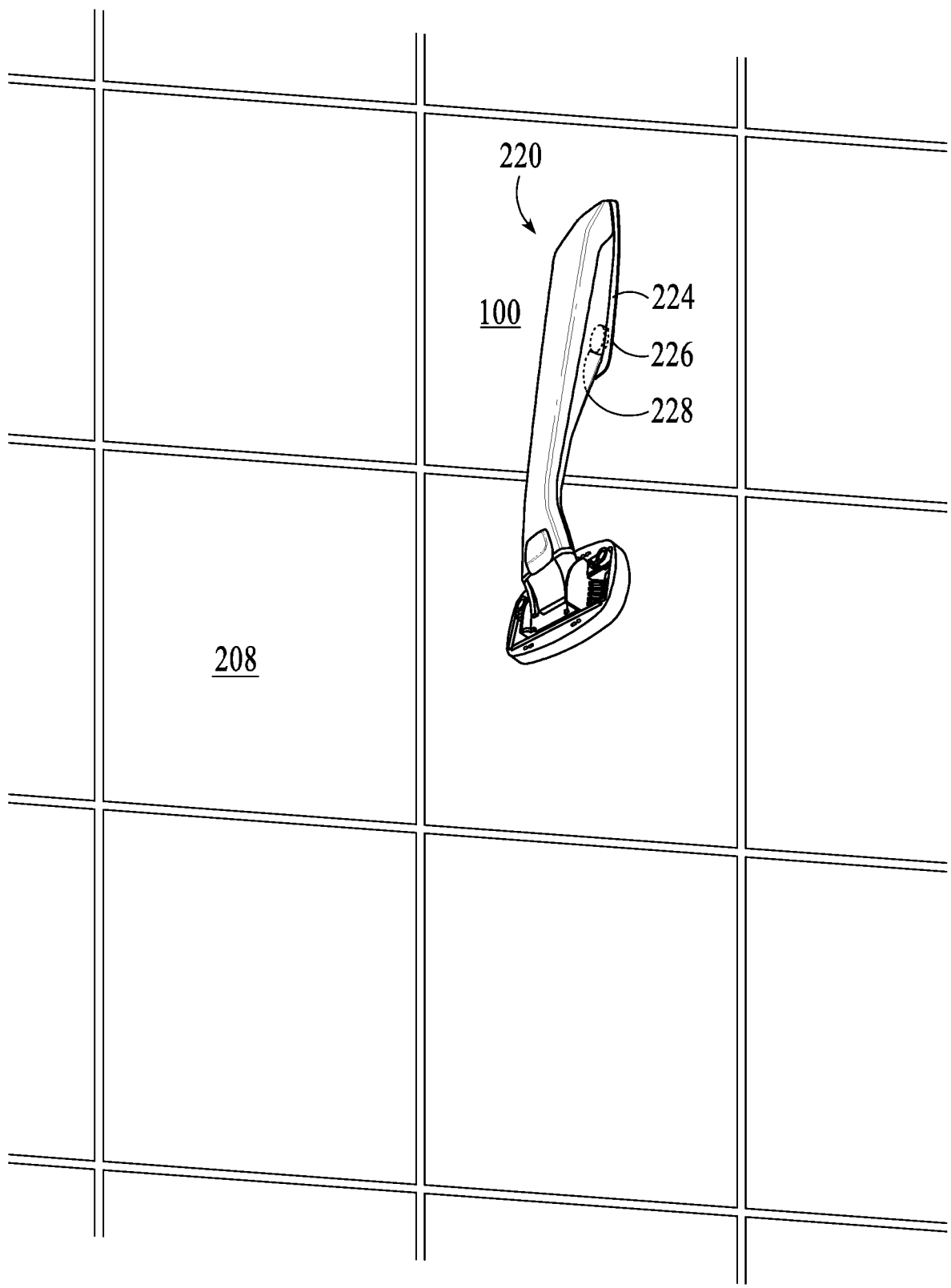
FIGS. 5F and 5G illustrate perspective and side views of the razor being magnetically held from a vertical surface, in accordance with some embodiments.
Figure 5G:
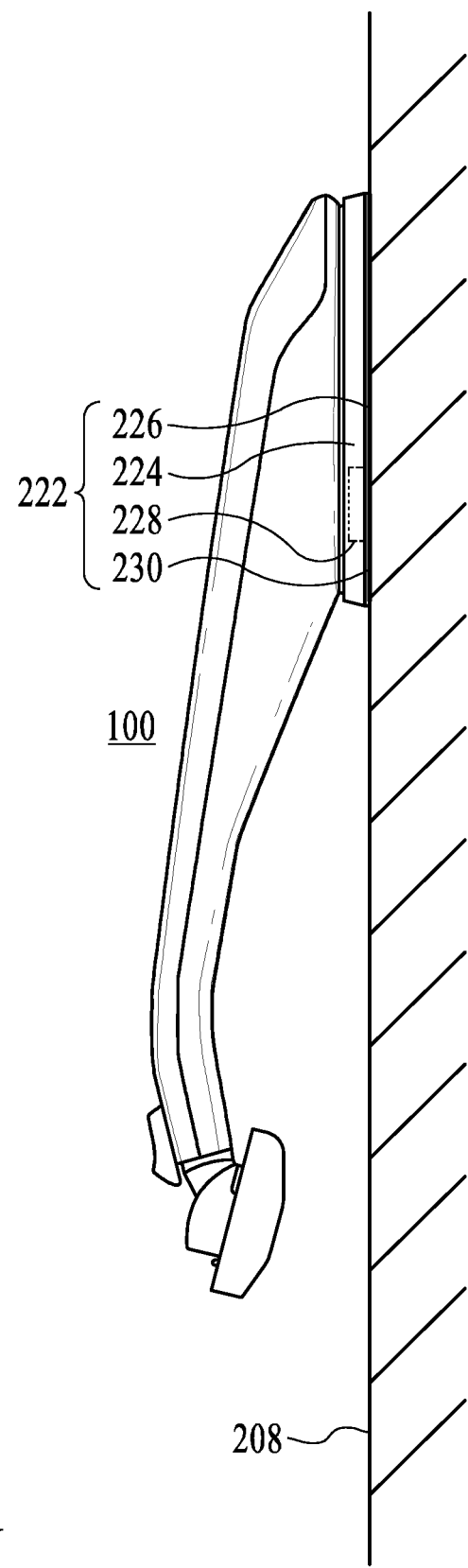

Referring now to FIGS. 5F and 5G, side, lower perspective, and upper perspective views of razor holder system 220 are illustrated. Razor holder 222 include upper and lower enclosures 224 and 226, respectively, and magnet 228 disposed in between them. In some embodiments, upper enclosure 224 may include an aperture through which magnet 228 may be extend upwardly away from lower enclosure 226. In some embodiments, razor holder 222 could include an adhesive strip 230 applied to a surface of lower enclosure 226 and adapted to affix razor holder 222 to a surface such as, but not limited to, vertical surface 208. When razor 100 is not used by a user, magnet 130 disposed or embedded in razor 100 may magnetically engage magnet 228 of razor holder 222 affixed to vertical surface 208, such that razor 100 may be magnetically held in a resting and/or hanging position that is substantially parallel to vertical surface 208.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed:
1. A razor handle for shaving a person's skin, comprising:
a first surface;
a second surface opposing the first surface and extending between a first end and an opposing second end, the second end for receiving a razor cartridge; and
a counterbalancing object, where
the first and second surfaces are configured to be placed into either of two horizontal resting positions at the selection of a user,
the first surface is configured with a first flat surface extending more than half of the length of the first surface, a second flat surface extending between the first end and the first flat surface, a third surface extending from the second end, and a first pivot surface formed at an intersection of the first flat surface and the third surface,
the second surface is configured with a third flat surface extending from the first end, a fourth surface extending from the second end for more than half of the length of the second surface, and a second pivot surface formed at an intersection of the third flat surface and the fourth surface,
the first surface extends angularly away from a reference coinciding with and extending through the third flat surface,
the first, second, and third flat surfaces are neither parallel nor perpendicular to each other, and
the counterbalancing object is disposed between at least the first and third flat surfaces, where
a first horizontal resting position is defined as a position in which the first flat surface rests flatly against a horizontal surface, such that
the fourth surface extends downwardly from the second end and then upwardly until reaching the second pivot surface, and
the fourth surface and at least one blade disposed in the razor cartridge are oriented away from a horizontal reference coinciding with and extending through the horizontal surface, and
a second horizontal resting position is defined as a position in which the third flat surface rests flatly against the horizontal surface, such that
the fourth surface extends upwardly from the second end and then downwardly until reaching the second pivot surface, and
the fourth surface and the at least one blade disposed in the razor cartridge are oriented towards the horizontal reference without intersecting the horizontal reference, whereby
a downward force imparted by the counterbalancing object creates a moment offsetting an opposing moment imparted by at least the razor cartridge and the at least one razor blade when the first flat surface or the third flat surface rests flatly against the horizontal surface in the first horizontal resting position or the second horizontal resting position, respectively,
the downward force imparted by the counterbalancing object maintains the orientation of the fourth surface and the at least one blade disposed in the razor cartridge when the third flat surface rests flatly against the horizontal surface in the second horizontal resting position, and the first end moves upwardly away from the horizontal reference and the second end moves downwardly towards the horizontal reference when the third flat surface rests flatly against the horizontal surface in the second horizontal resting position but for the counterbalancing object and the imparted downward force, thereby preventing the razor cartridge from intersecting the horizontal reference in both the first and second horizontal resting positions.

2. The razor handle of claim 1, wherein the counterbalancing object is further disposed between at least the second and third flat surfaces, and one end of the counterbalancing object is wedge-shaped to conform to a wedge-shaped first end formed at an intersection of the second and third flat surfaces.

3. The razor handle of claim 1, wherein the counterbalancing object is a magnet.

4. The razor handle of claim 1, wherein the counterbalancing object includes a magnet.

5. The razor handle of claim 1, wherein the first and second surfaces extend across a base and an arm, where a vertical reference of the razor handle, when in the second horizontal resting position, extends upwardly and perpendicularly away from the horizontal reference at the second pivot surface, where the base, having a first center of mass located a first distance from the vertical reference of the razor handle, extends from the first end to the vertical reference of the razor handle, and the arm, having a second center of mass located a second distance from the vertical reference of the razor handle, extends from the vertical reference of the razor handle to the second end, such that the first and second distances are measured along the horizontal reference, and the first distance is less than the second distance.

6. The razor handle of claim 5, wherein the base extends a third distance from the first end to the vertical reference of the razor handle, and the arm extends a fourth distance from the vertical reference of the razor handle to the second end, such that the third and fourth distances are measured along the horizontal reference, and the third distance is less than the fourth distance.

7. The razor handle of claim 1, wherein the first and second surfaces extend across a base and an arm, where a vertical reference of the razor handle, when in the second horizontal resting position, extends upwardly and perpendicularly away from the horizontal reference at the second pivot surface, where the base extends a first distance from the first end to the vertical reference of the razor handle, and the arm extends a second distance from the vertical reference of the razor handle to the second end, such that the first and second distances are measured along the horizontal reference, and the first distance is less than the second distance.

8. The razor handle of claim 1, further comprising:

a magnet secured between at least the first and third flat surfaces, where the first and second surfaces are further configured for user placement of the razor handle into a vertical resting position, where the vertical resting position is defined as a position in which the third flat surface hangs flatly against a vertical surface of a magnetic holder, such that the fourth surface extends outwardly from the second end and away from a vertical reference of the magnetic holder, and then inwardly towards the vertical reference of the magnetic holder until reaching the intersection, and the fourth surface and the at least one blade disposed in the razor cartridge are oriented towards the vertical reference of the magnetic holder without intersecting the vertical reference, whereby a magnetic engagement between the magnet and the magnetic holder maintains the orientation of the fourth surface and the at least one blade disposed in the razor cartridge towards the vertical reference of the magnetic holder when the third flat surface hangs flatly against the vertical surface of the magnetic holder in the vertical resting position, thereby preventing the razor cartridge from intersecting the vertical reference of the magnetic holder in the vertical resting position.

* * * * *